US012005458B2

(12) United States Patent
Gunnarsson

(10) Patent No.: US 12,005,458 B2
(45) Date of Patent: Jun. 11, 2024

(54) GYRATORY CRUSHER MAIN SHAFT SLEEVE

(71) Applicant: SANDVIK SRP AB, Svedala (SE)

(72) Inventor: Johan Gunnarsson, Sovde (SE)

(73) Assignee: Sandvik SRP AB, Svedala (SE)

( * ) Notice: Subject to any disclaimer, the term of this patent is extended or adjusted under 35 U.S.C. 154(b) by 542 days.

(21) Appl. No.: 17/281,318

(22) PCT Filed: Oct. 1, 2018

(86) PCT No.: PCT/EP2018/076660
§ 371 (c)(1),
(2) Date: Mar. 30, 2021

(87) PCT Pub. No.: WO2020/069719
PCT Pub. Date: Apr. 9, 2020

(65) Prior Publication Data
US 2021/0402410 A1 Dec. 30, 2021

(51) Int. Cl.
*B02C 2/06* (2006.01)

(52) U.S. Cl.
CPC .................................... *B02C 2/06* (2013.01)

(58) Field of Classification Search
CPC .............. B02C 2/04; B02C 2/042; B02C 2/06
See application file for complete search history.

(56) References Cited

U.S. PATENT DOCUMENTS

| | | | | |
|---|---|---|---|---|
| 1,402,255 | A | 1/1922 | Sanborn | |
| 9,827,568 | B2 * | 11/2017 | Aberg | B02C 2/06 |
| 2015/0202630 | A1 * | 7/2015 | Aberg | B02C 2/005 241/207 |
| 2016/0271614 | A1 * | 9/2016 | Bergman | B02C 2/02 |
| 2016/0288129 | A1 * | 10/2016 | Holmberg | B02C 2/06 |

FOREIGN PATENT DOCUMENTS

| | | | |
|---|---|---|---|
| CN | 206106811 | U | 4/2017 |
| EP | 2689851 | A1 | 1/2014 |
| EP | 2692444 | A1 | 2/2014 |
| GB | 1031679 | A | 6/1966 |
| WO | 2015070993 | A1 | 5/2015 |

* cited by examiner

*Primary Examiner* — Faye Francis
(74) *Attorney, Agent, or Firm* — Corinne R. Gorski

(57) ABSTRACT

A gyratory crusher main shaft sleeve for friction fitting over an uppermost tapered end of a crusher main shaft includes an elongate axial wall extending from an upper end to a lower end and having external and internal facing surfaces aligned transverse so as to taper inwardly towards a central axis. The tapering is defined by a sleeve tapering angle formed between the internal facing surface and an imaginary axis parallel to the central axis. The internal surface of the sleeve has a section in the axial direction with an upper end and a lower end. The sleeve section, from the upper end to the lower end, has a section tapering angle formed between the internal surface and the imaginary axis. The section tapering angle is different from the sleeve angle defining the tapering of the sleeve from the sleeve upper end to the section upper end.

15 Claims, 6 Drawing Sheets

GYRATORY CRUSHER MAIN SHAFT SLEEVE

RELATED APPLICATION DATA

This application is a § 371 National Stage Application of PCT International Application No. PCT/EP2018/076660 filed Oct. 1, 2018.

FIELD OF INVENTION

The present invention relates to a gyratory crusher main shaft sleeve for positioning at an uppermost tapered end of a crusher main shaft and in particular, to a gyratory crusher main shaft.

BACKGROUND

Gyratory crushers are used for crushing ore, mineral and rock material to smaller sizes. Typically, the crusher comprises a crushing head mounted upon an elongate main shaft. A first crushing shell is mounted on the crushing head and a second crushing shell is mounted on a frame such that the first and second crushing shells define together a crushing gap through which the material to be crushed is passed. A driving device is arranged to rotate an eccentric assembly about the lower portion of the shaft, so as to cause the crushing head to perform a gyratory pendulum movement and crush the material introduced in the crushing gap.

U.S. Pat. No. 1,402,255 and GB1,031,679 disclose exemplary gyratory crushers.

In gyratory crushers the gyratory pendulum movement of the crushing head is supported by a lower bearing assembly positioned below the crushing head and a top bearing into which an upper end of the main shaft is journaled. Typically, the main shaft upper end is protected against wear by a sleeve. Commonly, the protective sleeve comprises a cylindrical geometry and is held at the main shaft via an interference or friction fit. This arrangement requires the sleeve to be heated to increase its diameter to enable mounting and possible disassembly at the main shaft.

However, a number of problems exist with conventional protective sleeves. In particular, assembling and re-assembling of crushers when the sleeve is changed due to wear may be both time consuming and require a great amount of material. When changing the sleeve due to excessive wear or if reshaping of the sleeve is needed both the sleeve and the shaft need to be worked on to get proper surfaces for assembling the sleeve. On large crushers, protective sleeves have a substantial wall thickness with a great difference in material thickness between lower and upper parts. It is not unusual that the lower thinner end will be damaged, i.e. bent or even broken. Thus, what is required is a main shaft sleeve that addresses the above problems.

SUMMARY

It is an object of the present invention to provide a sleeve for a main shaft of a gyratory crusher that enables convenient attachment and detachment at the shaft so as to be quickly and conveniently assembled and disassembled. Further there is an object to save material and avoid that the lower and thinner part of the sleeve is bent or broken. Another object is to secure the sleeve and shaft stay correctly in place while operating.

The objective is achieved by providing a sleeve having an internal facing surface that tapers inwardly in the axial direction towards an axis of the sleeve from a first lower end to a second upper end. The present sleeve arrangement is configured for secure mounting in position via an interference or friction fit arrangement in direct contact with a tapered end region of the main shaft. In particular, a conical shape profile of the internal facing surface of the sleeve having a section with a different conical shape profile than the rest of the sleeve is capable of sliding over a corresponding conical shaped main shaft end region efficiently guides the sleeve in place when being mated. As with existing devices, the present sleeve may be heated to increase its diameter immediately prior to assembly.

Similarly, to facilitate disassembly, heat may be applied to the sleeve together with mechanical agitation.

According to a first aspect of the present invention there is provided a gyratory crusher main shaft sleeve for friction fitting over an uppermost tapered end of a crusher main shaft, the sleeve comprising: an elongate axial wall from an upper end to a lower end extending and being centred around a centre axis and having an external facing surface and an internal facing surface aligned transverse to taper inwardly towards the axis, and wherein the tapering is defined by a sleeve tapering angle between the internal facing surface and an imaginary axis being parallel with the axis. The internal surface of the sleeve has a section in axial direction with an upper end and a lower end, which sleeve section from the upper end to the lower end has a section tapering angle between the internal surface and the imaginary axis being different compared to the sleeve angle defining the tapering of the sleeve from the sleeve upper end to the section upper end. This facilitates assembling and disassembling.

Preferably, the section angle of the sleeve section is smaller than the sleeve angle of the sleeve. Thus, the sleeve section is less tapered than the part of the sleeve above the section. A shape profile of the internal facing surface of the sleeve may define a section of a cone in the axial direction, so that the conical angle of the sleeve following the internal surface from the sleeve upper end changes when reaching the section upper end. Whereby a more robust lower end that hinders breakage is achieved.

Optionally, the sleeve section is arranged close to the first lower end of the sleeve, so that the sleeve section is located below the bearing assembly. The wall thickness of the sleeve may decrease in a direction from the upper end to the lower end, and at the sleeve section the wall thickness may decrease to a lower extent so that material is saved.

Preferably, the sleeve section lower end is arranged in connection to a lower sharp tapered edge region with an axial length and being the lowest part of the sleeve connecting to the first lower end. Alternatively, this lowest part of the sleeve may have a curved edge region. This region may be curved radially outward relative to the longitudinal axis in a direction towards the external facing surface of the sleeve such that the wall thickness decreases to zero at the curved region.

Optionally, the length from the sleeve section upper end to the sleeve section lower end is approximately 10% of the total axial length of the sleeve. The length from the sleeve section upper end to the sleeve section lower end may also be 8%, 9%, 11% or 12% of the total axial length of the sleeve.

Also, the length from the sleeve section upper end to the sleeve section lower end is approximately 13% of the axial length of the internal surface from the sleeve upper end to the section lower end. This length may be defined as the difference between the total axial length of the sleeve and the axial length of the sharp tapered edge region and it may also be in the ranges 10-12% or 14-17%.

Preferably, the sleeve section is cylindrical in a circumferential direction of the internal facing surface such that the value of the section angle is 0 along the sleeve section. The thickness of the wall may then be uniform along the sleeve section and the thickness of the wall along the full axial length of the sleeve may decrease in a direction from a second upper end to a first lower end.

Optionally, the axial length of the sleeve section is approximately the same as the axial length of the lower sharp tapered edge region.

Preferably, a cross sectional shape profile of the external facing surface of the sleeve is substantially circular. Also, a cross sectional shape profile of the internal facing surface of the sleeve is substantially circular. And a shape profile of the external facing surface of the sleeve defines a section of a cylinder in the axial direction.

According to a second aspect of the present invention there is provided a gyratory crusher main shaft comprising: an elongate shaft body having a first lower end for positioning at a lower region of the crusher and a second upper end for positioning at an upper region of the crusher relative to the first end, wherein an axial region of the shaft body extending from the upper end is tapered longitudinal relative to a centre axis of the shaft body such that a cross sectional area of the shaft body at the tapered region decreases in a direction from the first lower end to the second upper end, the tapered region configured to mount a shaft sleeve, and wherein the tapering is defined by a shaft tapering angle between the outward facing surface and an imaginary axis being parallel with the axis; and the main shaft further comprises a sleeve as described herein such that the sleeve is positioned in contact with an outward facing surface at the main shaft tapered region.

Preferably, the main shaft tapered region has a shaft section in axial direction with an upper end and a lower end, which shaft section from the upper end to the lower end has a section tapering angle between the outward facing surface and the axis being different compared to the sleeve angle defining the tapering of the shaft from the shaft upper end to the section upper end.

Optionally, the axial length of the cylindrical shaft section is the same as the axial length of the cylindrical sleeve section such that both sections correspondingly mate.

Preferably, the main shaft further is connected to a cap arranged in close contact at the upper end in order to keep the sleeve safely arranged around the axial region of the shaft body. The cap may also be defined as a cover or a lid.

Optionally, the thickness of the cap is half of the thickness of the wall at the upper end. The cap may also be tapered around the perimeter such that the diameter on the cap upper end is smaller than the diameter on the lower end connecting to and corresponding to the diameter of the upper end of the external surface of the sleeve. This ensures sleeve and shaft staying in place tightly together while the cruusher is operating.

Preferably, the thickness of the wall decreases substantially the full axial length of the sleeve such that the wall thickness at the upper end is approximately 20% of the radius of the main shaft tapered region in the cross section area at the upper end and the wall thickness of the sleeve at the sections is approximately 10% of the radius of the main shaft tapered region in the cross section area at the sections. The wall thickness at the upper end may also be in the range 20-25% of the radius of the main shaft tapered region in the cross section area at the upper end, and the wall thickness of the sleeve at the sections may be 10-15% of the radius of the main shaft tapered region in the cross section area at the sections.

According to a third aspect of the present invention there is provided a gyratory crusher comprising a main shaft and a sleeve.

BRIEF DESCRIPTION OF DRAWINGS

A specific implementation of the present invention will now be described by way example only and with reference to the following drawings in which.

DETAILED DESCRIPTION

Figure 1:
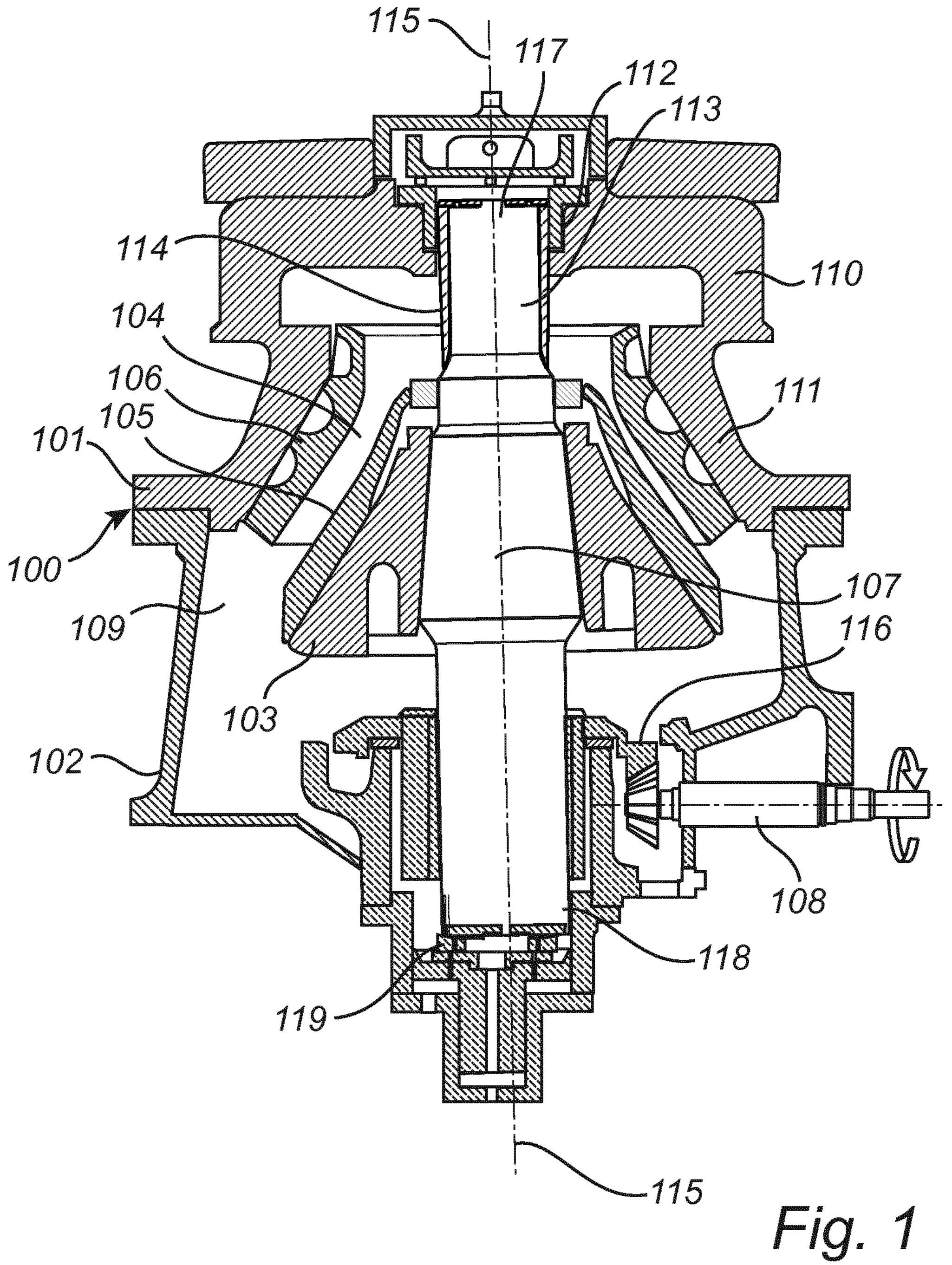
FIG. 1 is a cross-sectional side view of a gyratory crusher having a main shaft supported at its upper end by a top bearing set and having a protective sleeve mounted about the upper end of the main shaft.

Referring to FIG. 1, a crusher comprises a frame 100 having an upper frame 101 and a lower frame 102. A crushing head 103 is mounted upon an elongate shaft 107. A first crushing shell 105 is fixably mounted on crushing head 103 and a second crushing shell 106 is fixably mounted at top frame 101. A crushing zone 104 is formed between the opposed crushing shells 105, 106. A discharge zone 109 is positioned immediately below crushing zone 104 and is defined, in part, by lower frame 102.

Upper frame 101 is further divided into a top shell 111, mounted upon lower frame 102 (alternatively termed a bottom shell), and a spider that extends from top shell 111 and represents an upper portion of the crusher. The spider comprises two diametrically opposed arms 110 that extend radially outward from a central cover positioned on a longitudinal axis 115 extending through frame 100 and the gyratory crusher generally. Arms 110 are attached to an upper region of top shell 111 via an intermediate annular flange that is centred around longitudinal axis 115. Typically, arms 110 and top shell 111 form a unitary structure and are formed integrally.

A drive (not shown) is coupled to main shaft 107 via a drive shaft 108 and suitable gearing 116 so as to rotate shaft 107 eccentrically about longitudinal axis 115 and to cause crushing head 103 to perform a gyratory pendulum movement and crush material introduced into crushing gap 104. An upper end region of a shaft 113 comprises an axial taper to define an upper conical section. The upper conical section tapers inwardly in the bottom to top direction away from head 103. An uppermost end 117 of shaft 107 is maintained in an axially rotatable position by a top bearing assembly 112. Similarly, a bottom end 118 of shaft 107 is supported by a bottom bearing assembly 119.

To avoid excessive wear of the upper conical portion 113, a substantially cylindrical wear sleeve 114 is mounted over and about shaft region 113. Sleeve 114 is held in position at region 113 by an interference or friction fit and is provided in close touching contact over the axial length of the upper conical portion 113. Accordingly, sleeve 114 is positioned intermediate between bearing assembly 112 and region 113 to absorb the radial and axial loading forces resultant from the crushing action of the gyratory pendulum movement.

Figure 2:
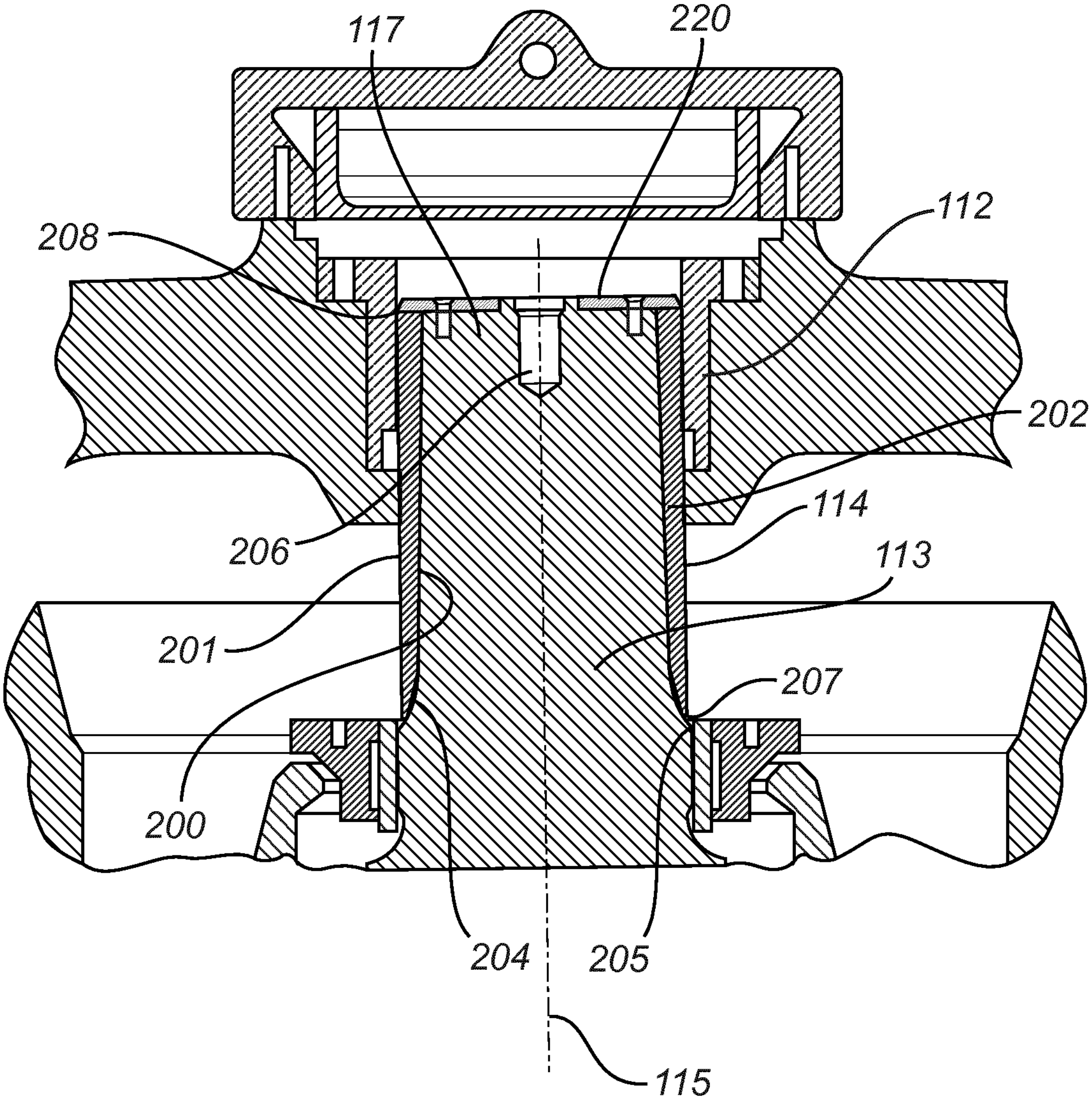
FIG. 2 is a magnified view of the upper region of the crusher of FIG. 1.

With reference to FIG. 2, sleeve 114 comprises an external facing surface 201 and an internal facing surface 200, the orientation of faces 201, 200 being relative to the longitudinal axis 115 extending through upper end shaft region 113 and sleeve 114.

Internal facing surface 200 is secured in direct contact against an external facing surface 202 of conical region 113. Accordingly, internal facing surface 200 tapers inwardly towards longitudinal axis 115 from a first end 207 and a second end 208, where the first end 207 is positioned below second end 208 within the crusher during normal use. A cross-sectional shape profile of internal facing surface 200 and external facing surface 201 is circular substantially along the length of sleeve 114 between first and second ends 207, 208. However, external facing surface 201 is aligned substantially parallel with axis 115, such that sleeve 114 when viewed externally comprises a substantially cylindrical geometry. According to this configuration, the annular axial wall 203 of sleeve 114 that is defined between opposed surfaces 200, 201 comprises a thickness that tapers and reduces in a direction from second upper end 208 to first lower end 207. As will be appreciated, to enable sleeve 114 to fit in close shrink-fit contact with conical end portion 113, the taper angle of inner surface 200 is substantially equal to the taper angle of the external facing surface 202 of upper end shaft region 113 relative to axis 115.

At first lower end 207, a thickness of wall 203 decreases sharply as internal facing surface 200 is sharply tapered or curves outwardly toward external facing surface 201. This curved or sharp tapered annular edge region 204 is configured to fit against a shoulder region 205 of shaft 107 that curves radially outward at a region immediately above crushing shell 105 and head 103.

Uppermost end 117 of shaft 107 is retained in position by a mounting pin 206, aligned at axis 115, that extends axially downward from a circular cover 220.

Figure 3:
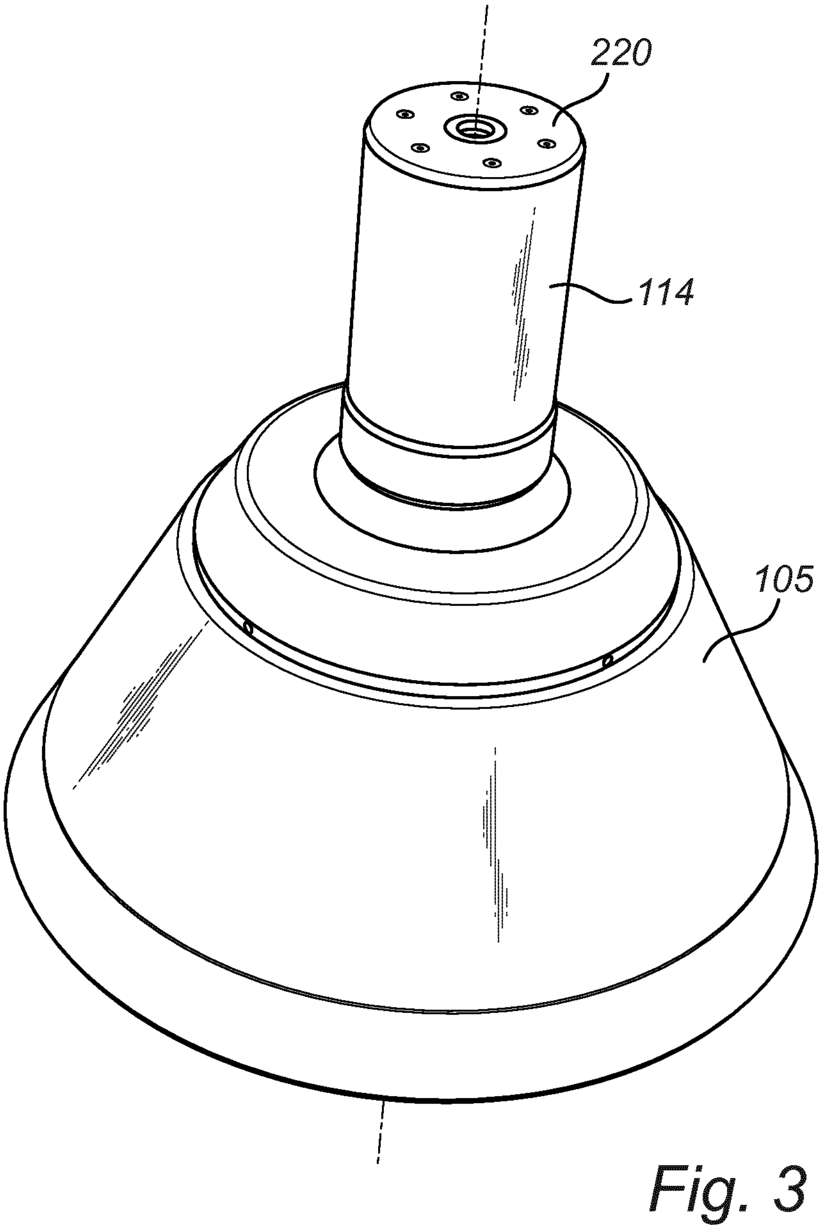
FIG. 3 is a perspective view of the main shaft with the sleeve.

FIG. 3 discloses a perspective view of the first crushing shell 105 mounted upon the elongate shaft 107. The sleeve 114 is mounted around the uppermost end 117 of shaft 107. On top of the uppermost end 117 of shaft 107 the cover 220 is centred around the axis 115. Accordingly, sleeve 114 is fully mated in position over conical shaft region 113 when the cover 220 is seated against shaft end 117 and the upper end 208 of the sleeve. The cover 220 helps the sleeve 114 to stay closely connected to the upper end shaft region 113 while the crusher is operating.

Figure 4A:
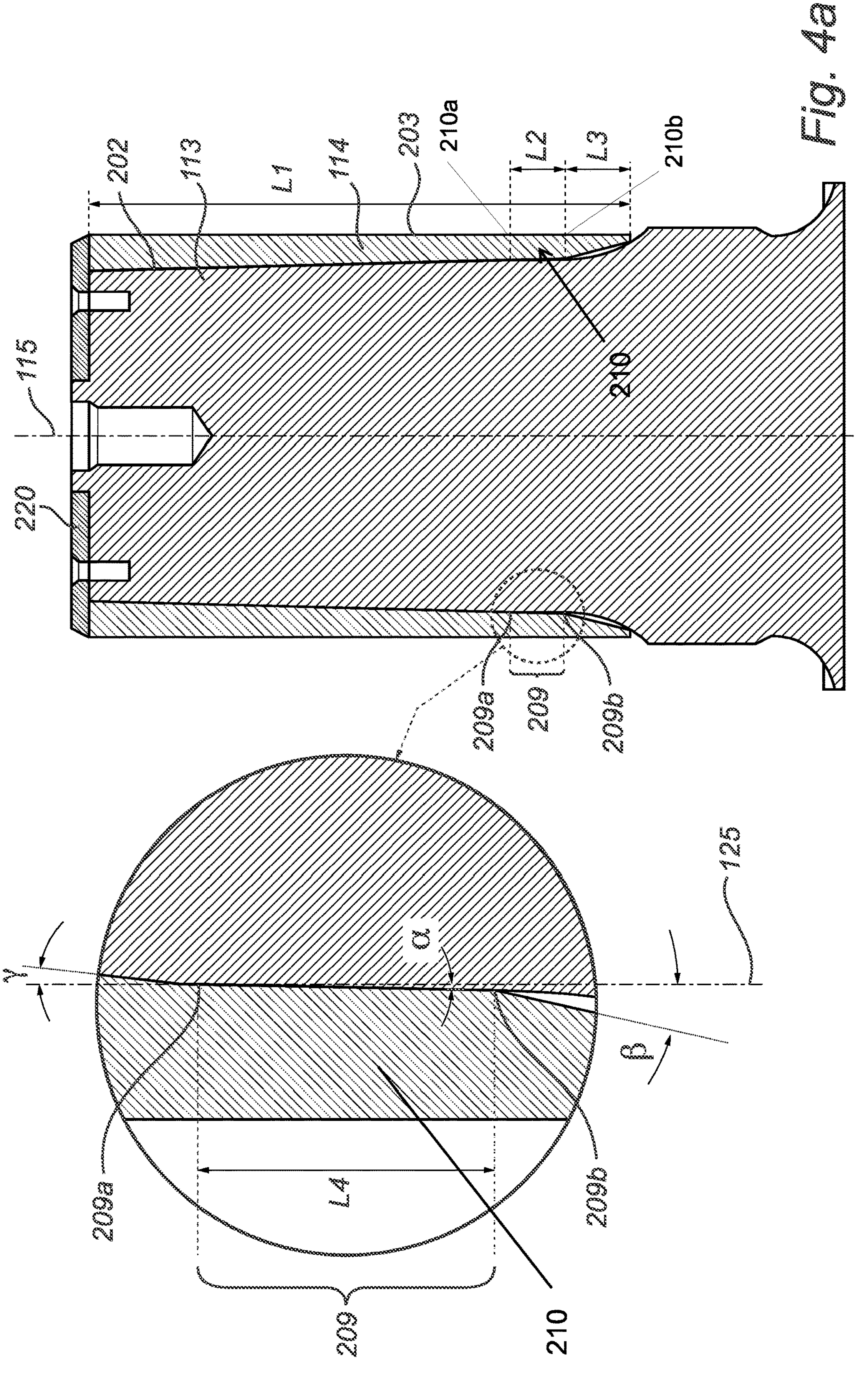
FIG. 4*a* is a cross-sectional side view of a first embodiment of the main shaft with the sleeve.
Figure 4B:
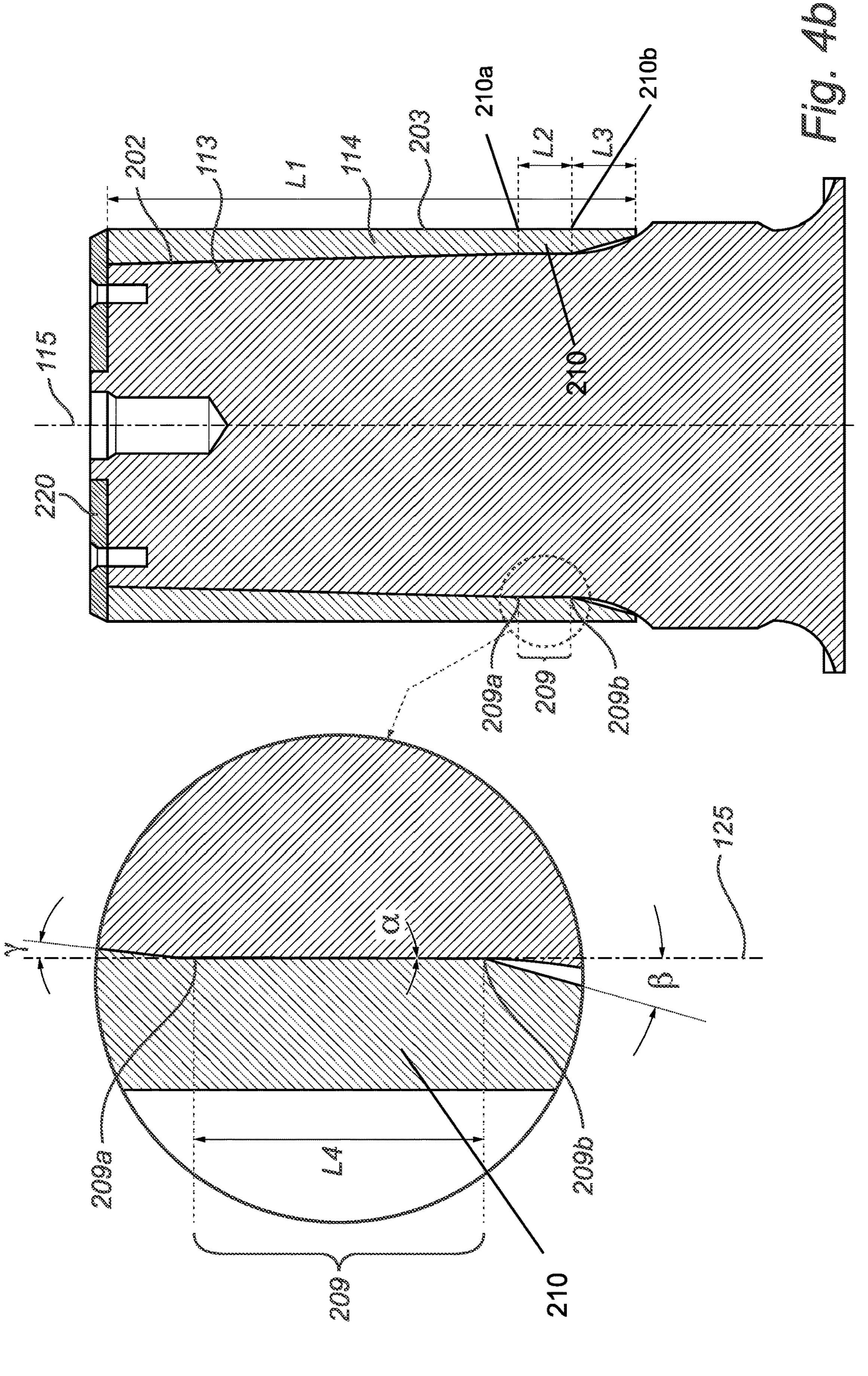
FIG. 4*b* is a cross-sectional side view of a second embodiment of the main shaft with the sleeve.

With reference to FIGS. 4*a* and 4*b*, the upper end shaft region 113 is enveloped laterally by the sleeve 114. The sleeve has wall thickness 203. The inner surface of the sleeve 114 is in direct contact with the external facing surface 202 of the upper end shaft region 113. The cover 220 is in direct contact with the upper end shaft region 113 and the sleeve 114, centred around axis 115. The outer perimeter of the cover is slightly tapered outwardly from the top to the lower end, so that the lower end of the cover 220, which is in contact with the upper end shaft region 113 and the sleeve 114, has the same diameter as the sleeve upper end 208. Both the upper end shaft region 113 external facing surface 202 and the sleeve 114 internal facing surface 200 are tapered throughout the axial length.

The internal surface 200 of the sleeve 114 has a section 210 in the axial direction with an upper end 210*a* and a lower end 210*b*. The sleeve section 210 from the upper end 210*a* to the lower end 210*b* has a section tapering angle α between the internal surface and an imaginary axis 125 that is different from the sleeve angle γ defining the tapering of the sleeve from the sleeve upper end 208 to the section upper end 210*a* between the internal surface 200 and the imaginary axis 125. The imaginary axis 125 is parallel with the centre axis 115 and passes through the sleeve section upper end 210*a*. For example, the angle α is smaller than the angle γ.

The sleeve section 210 is arranged close to the first lower end 207 of the sleeve. Thus, the sleeve section is located below the bearing assembly 112 of the crusher.

FIG. 4*a* discloses a first embodiment having a tapered shaft 113 and sleeve 114. The main shaft 107 tapered region 113 has a shaft section 209. This shaft section 209 is defined by upper end 209*a* and lower end 209*b*, and the sleeve section 210 is defined by an upper end 210*a* and a lower end 210*b*. When the upper end shaft region 113 and the sleeve 114 are mated together both sections 209, 210 are arranged closely together, so that their upper ends 209*a*, 210*a* and their lower ends 209*b*, 210*b* are located at approximately the same axial location.

With reference to FIG. 4*b*, disclosing a second embodiment, the tapering of the upper end shaft region 113 external facing surface 202 and the sleeve 114 internal facing surface 200 is disrupted at the shaft section 209 and the sleeve section 210. Both the sleeve and the shaft sections 209, 210 are cylindrical. Both sections 209, 210 are devoid of any tapering along their axial lengths, so that the diameter of the shaft is uniform along the shaft section 209 and the thickness of the wall 203 is uniform along the sleeve section 210.

Figure 5:
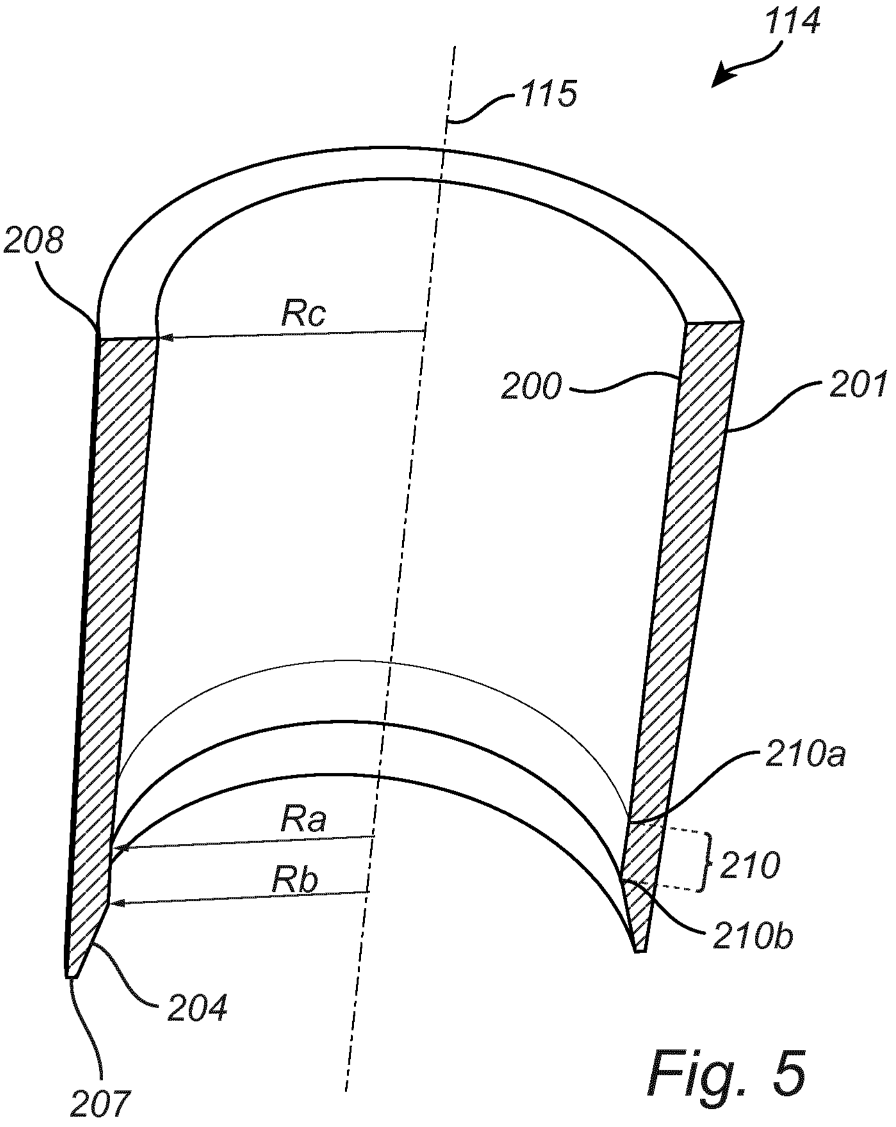
FIG. 5 is a cross-sectional side view of the sleeve.

Further with reference to FIGS. 4*a*, 4*b* and 5, the full axial length of the sleeve 114 from the first lower end 207 to the second upper end 208 is defined as L1. The axial length of the sleeve section 210 from the upper 210*a* to the lower end 210*b* is L2. The axial length L3 of the lower curved or sharp tapered edge region is the length from the lower end sleeve section 210*b* to the sleeve lower end 207. L2 and L3 have approximately the same lengths. The axial length of the cylindrical shaft section 209, being the length from the upper end shaft section 209*a* to the lower end shaft section 209*b*, is defined as L4. L4 is approximately the same as the axial length L2 of the cylindrical sleeve section 210, such that both sections 209, 210 correspondingly mate. In a further embodiment L2 and L4 may be longer than L3, they may be twice as long or less.

Further, the tapering of the internal surface 200 of the sleeve will be described. A radius Rc at the upper end 208 of the sleeve is defined from the centre axis 115 to the internal surface 200. Further down of the sleeve the radius increases, so the radius Ra at the section upper end 210*a* is larger than radius Rc. The radius Rb at the sleeve lower end 210*b* is either slightly larger than Ra, as can be seen in FIG. 4*a*, where the angle α is larger than 0, or corresponds to Ra, as can be seen in FIG. 4*b* where the angle α is equal 0.

The axial wall 203 comprises a thickness that decreases from upper end 208 to lower end 207 over the entire length of sleeve 114. The thickness decrease is uniform from the second upper end 208 to the upper end 210*a* of the cylindrical sleeve section 210. In the sleeve section 210 seen in FIG. 4*a*, there is less decrease of the thickness, since this section has an angle α being smaller than the angle γ. In the sleeve section 210 seen in FIG. 4*b*, there is no decrease, since this section has a uniform wall thickness with the angle α being 0.

From the lower end 210*b* of the cylindrical sleeve section 210 to the lower end 207 of the sleeve the axial wall 203 thickness decreases more than the decrease in thickness from the sleeve upper end 208 to the cylindrical section upper end 210*a*, resulting in a sharp tapered end region 204. The end region 204 may also be curved. The sharp tapered region has an angle β being the angle between the internal surface 200 at the end region 204 and the imaginary axis 125. The angle β is larger than both angle α and angle γ.

When disassembling the crusher for maintenance or repair, the cap 220 is removed by first removing the fastening means, such as screws keeping the cap secured to the shaft 113. After having removed the cap the sleeve 114 can be dismounted.

The invention claimed is:

1. A gyratory crusher main shaft sleeve arranged for friction fitting over an uppermost tapered end of a crusher main shaft, the sleeve comprising:

an elongate axial wall extending from an upper end to a lower end and being centered around a center axis, the axial wall having an external facing surface and an internal facing surface aligned transverse to taper inwardly towards the center axis, and wherein the tapering is defined by a sleeve tapering angle formed between the internal facing surface and an imaginary axis arranged parallel with the center axis, and wherein the internal surface of the sleeve has a section in an axial direction having an upper end and a lower end, the section, from the upper end to the lower end, having a section tapering angle formed between the internal surface and the imaginary axis, the section tapering angle being different compared to the sleeve tapering angle defining the tapering of the sleeve from the upper end of the axial wall to the section upper end, wherein the section tapering angle of the sleeve section is smaller than the sleeve tapering angle of the sleeve.

2. The sleeve as claimed in claim 1, wherein the sleeve section is arranged close to the lower end of the sleeve.

3. The sleeve as claimed in claim 1, wherein the sleeve section lower end is arranged in connection to a lower sharp tapered edge region having an axial length and being a lowest part of the sleeve connecting to the lower end.

4. The sleeve as claimed in claim 1, wherein a length from the sleeve section upper end to the sleeve section lower end is approximately 10% of a total axial length of the sleeve.

5. The sleeve as claimed in claim 1, wherein a length from the sleeve section upper end to the sleeve section lower end is approximately 13% of an axial length of the internal surface from the sleeve upper end to the section lower end.

6. The sleeve as claimed in claim 1, wherein the sleeve section is cylindrical in a circumferential direction of the internal facing surface such that the value of the section tapering angle is 0 along the sleeve section.

7. The sleeve as claimed in claim 3, wherein an axial length of the sleeve section is approximately the same as an axial length of the lower sharp tapered edge region.

8. A gyratory crusher main shaft comprising:

an elongate shaft body having a lower end for positioning at a lower region of the crusher and an upper end for positioning at an upper region of the crusher relative to the first end, wherein an axial region of the shaft body extending from the upper end is tapered longitudinally relative to a center axis of the shaft body such that a cross sectional area of the shaft body at the tapered axial region decreases in a direction from the lower end to the upper end, and wherein tapering of the tapered axial region is defined by a shaft tapering angle between the outward facing surface and an imaginary axis that is parallel with the center axis; and a sleeve comprising an elongate axial wall extending from an upper end to a lower end and being centered around the center axis, the axial wall having an external facing surface and an internal facing surface aligned transverse to taper inwardly towards the center axis, and wherein the tapering is defined by a sleeve tapering angle formed between the internal facing surface and an imaginary axis arranged parallel with the center axis, and wherein the internal surface of the sleeve has a section in an axial direction having an upper end and a lower end, the section, from the upper end to the lower end, having a section tapering angle formed between the internal surface and the imaginary axis, the section tapering angle being different compared to the sleeve tapering angle defining the tapering of the sleeve from the upper end of the axial wall to the section upper end, wherein the section tapering angle of the sleeve section is smaller than the sleeve tapering angle of the sleeve, the tapered axial region of the shaft body being configured to mount the sleeve, the sleeve being friction fitted over the tapered axial region at the upper end of the main shaft such that the sleeve is positioned in contact with an outward facing surface at the tapered axial region of the upper end.

9. The main shaft as claimed in claim 8, wherein the tapered axial region has a shaft section in an axial direction with an upper end and a lower end, wherein the shaft section from the upper end to the lower end has a section tapering angle formed between the outward facing surface and the center axis, the section tapering angle being different compared to the shaft tapering angle, which defines the tapering of the shaft from the shaft upper end to the section upper end.

10. The main shaft as claimed in claim 8, wherein an axial length of the shaft section is the same as an axial length of the sleeve section such that both sections correspondingly mate.

11. The main shaft as claimed in claim 8, wherein the main shaft is connected to a cap arranged in close contact at the upper end in order to keep the sleeve safely arranged around the tapered axial region of the shaft body.

12. The main shaft as claimed in claim 11, wherein a thickness of the cap is half of a thickness of the axial wall at the upper end.

13. The main shaft as claimed in claim 11, wherein the cap is tapered around a perimeter such that a diameter of the cap upper end is smaller than a diameter on the lower end connecting to and corresponding to a diameter of the upper end of the external surface of the sleeve.

14. The main shaft as claimed in claim 8, wherein a thickness of the axial wall decreases substantially along a full axial length of the sleeve such that a wall thickness at the upper end is approximately 20% of a radius of the main shaft tapered axial region in the cross section area at the upper end and a wall thickness of the sleeve at the sections is approximately 10% of a radius of the main shaft tapered region in the cross section area at the shaft and sleeve sections.

15. A gyratory crusher comprising:

a main shaft having an elongate shaft body having a lower end for positioning at a lower region of the crusher and an upper end for positioning at an upper region of the crusher relative to the first end, wherein an axial region of the shaft body extending from the upper end is tapered longitudinally relative to a center axis of the shaft body such that a cross sectional area of the shaft body at the tapered axial region decreases in a direction from the lower end to the upper end, and wherein tapering of the tapered axial region is defined by a shaft tapering angle between the outward facing surface and an imaginary axis that is parallel with the center axis; and a sleeve comprising an elongate axial wall extending from an upper end to a lower end and being centered around the center axis, the axial wall having an external facing surface and an internal facing surface aligned transverse to taper inwardly towards the center axis, and wherein the tapering is defined by a sleeve tapering angle formed between the internal facing surface and an imaginary axis arranged parallel with the center axis, and wherein the internal surface of the sleeve has a section in an axial direction having an upper end and a lower end, the section, from the upper end to the lower end, having a section tapering angle formed between the internal surface and the imaginary axis, the section tapering angle being different compared to the sleeve tapering angle defining the tapering of the sleeve from the upper end of the axial wall to the section upper end, wherein the section tapering angle of the sleeve section is smaller than the sleeve tapering angle of the sleeve, the tapered axial region of the shaft body being configured to mount the sleeve, the sleeve being friction fitted over the tapered axial region at the upper end of the main shaft such that the sleeve is positioned in contact with an outward facing surface at the tapered axial region of the upper end.

* * * * *